Patented Nov. 22, 1949

2,489,235

UNITED STATES PATENT OFFICE 2,489,235

SYNTHESIS OF BIOTIN

Moses Wolf Goldberg, Upper Montclair, and Leo H. Sternbach, Montclair, N. J., assignors to Hoffmann-La Roche Inc., Roche Park, Nutley, N. J., a corporation of New Jersey No Drawing. Application July 24, 1947, Serial No. 763,446

14 Claims. (Cl. 260—309)

Our invention relates to a new and improved method for the synthesis of biotin and also to new compounds employed as intermediates for this purpose.

In our previous application, Serial No. 673,642, filed May 21, 1946, of which the instant application is a continuation-in-part, we have disclosed a method for producing d,l-biotin. The present invention is characterized by the fact that it permits the direct production of the optically active forms of biotin, d-biotin and l-biotin, of which the d-form is the naturally occurring one. In other words, according to our invention, it is possible to obtain an optically active biotin without having first to synthesize d,l-biotin and then to resolve the latter into its optical antipodes, as known by the prior art. This represents a great improvement over all known methods, and is achieved by carrying out our new biotin synthesis via a novel intermediate which can easily and in excellent yield be resolved into its optical antipodes. By using the optically active forms of this intermediate, d- and l-biotin are obtained, respectively, as end products of the new process, which is disclosed in more detail further below. It is, of course, also possible to obtain d,l-biotin by the same methods, if the synthesis is carried out via the d,-l form of our novel intermediate. In addition, this intermediate can also be used in a similar way for the synthesis of nor-biotin, in its racemic or optically active forms. Nor-biotin contains an ω-carboxy-propyl instead of an ω-carboxybutyl side chain, as in biotin, and is a new compound displaying antibiotin activity.

The use of optically active intermediates in our new process greatly facilitates the task of producing d-biotin on a technical scale, since the amounts of intermediates, and thus the volumes to be processed, are reduced in half, resulting in appreciable savings in investment and cost. Furthermore, the laborious methods for the resolution of d,-l-biotin into its optical antipodes, disclosed in the previous art and known to result in appreciable losses, have been eliminated.

According to our invention, we have found that thiophanium salts of the general formula I which are new compounds,

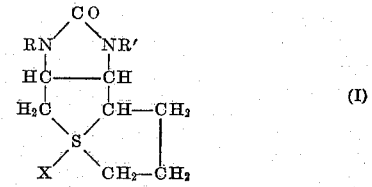

can be converted by a simple process into d,l-biotin, d-biotin, and l-biotin, respectively. In the above formula, X stands for an anion, for example, a chlorine ion, bromine ion, or d-camphorsulfonic acid ion. R and R' in the imidazolidone nucleus stand for hydrogen or a radical which can be replaced by hydrogen. Thus, either or both of the N atoms may carry such hydrogen-replaceable radicals as aralkyl radicals, for instance, α-aralkyl radicals like benzyl and α- or ring-substituted benzyl, for example, α-methyl- and α-ethyl-benzyl, o-methyl-benzyl, p-ethyl-benzyl, p-methoxy-benzyl, p-ethoxy-benzyl; or acyl radicals, for example, lower acyl radicals such as acetyl, propionyl, butyryl and the like, at least one of R and R' being a hydrogen-replaceable radical.

The following flow sheet shows the steps of our new synthesis:

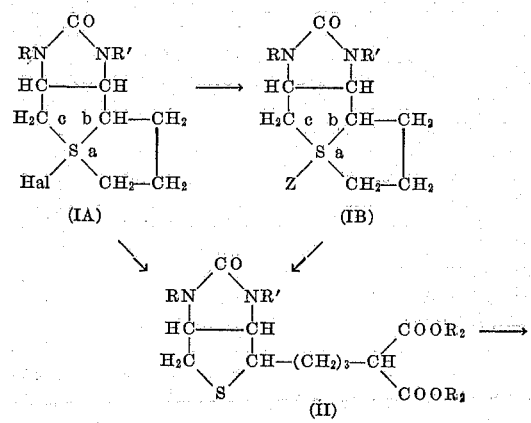

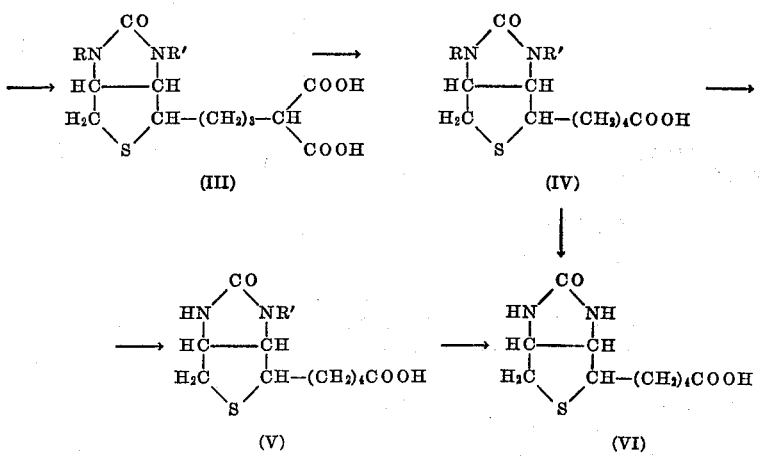

(III) (IV)

(V) (VI)

In the above formula Hal stands for a halogen ion, such as chlorine ion or bromine ion, Z stands for the d-camphorsulfonic acid ion or a similar optically active ion, R and R' have the same significance as in Formula I, and $R_2$ is an alkyl radical.

According to our invention, a trimethylene thiophanium halide (IA) can be reacted with a dialkyl metallo-malonate, such as a dialkyl alkali- or alkaline earth-metal-malonate, for instance, diethyl sodio-malonate or diethyl-magnesium-malonate, to form the $\omega,\omega$-dicarbalkoxy-butyl-thiophane derivative (II). It was not known that thiophanium compounds can react in such a way with organo-metal compounds, and it was surprising to find that the reaction proceeded in the way exemplified by Formula IA, IB and II. Theoretically, any one of the three carbon to sulfur bonds (a, b, c) present in (IA) or (IB) could have been split in the reaction with the dialkyl metallo-malonate, and it was not possible to foresee that only one, or predominantly bond (a), would be involved leading to compound (II) with a structure related to biotin. Upon saponification of compound (II) the $\omega,\omega$-di-carboxy-butyl-thiophane derivative (III) is obtained. Decarboxylation of the last-mentioned compound yields the biotin intermediate (IV), which upon replacement of R and R' by hydrogen, for example, by debenzylation if R and/or R' are benzyl radicals, yields d,l-biotin. d,l-Biotin can also be prepared in the same manner by starting from a mixture of the d- and l-trimethylene-thiophanium d-camphor-sulfonates (IB), or in general, from a thiophanium salt of Formula I.

To prepare d-biotin and l-biotin, the trimethylene-thiophanium halide (IA), such as the bromide or chloride, is first converted into the corresponding salt of an optically active acid. We have found that the trimethylene-thiophanium halides (IA) can be easily converted into the corresponding d-camphorsulfonates (IB), for example, with silver d-camphorsulfonate, to form a mixture of the d-, and the l-trimethylene-thiophanium d-camphorsulfonates (IB). From this mixture, the diastereometric salts are readily separated in excellent yields by a simple fractional crystallization. Thus, for example, by reacting 3,4-(1',3'-dibenzyl-2'-keto-imidazolido)-1,2-trimethylene-thiophanium bromide with silver d-camphorsulfonate and fractionally crystallizing the reaction products from a suitable solvent, for example, isopropanol or a mixture of absolute alcohol and ether, the d- and the l-3,4-(1',3'-dibenzyl-2'-keto-imidazolido)-1,2-trimethylene-thiophanium d-camphorsulfonates can be easily obtained in pure form. By subjecting the laevo-rotatory d-camphorsulfonate to the same series of reactions represented by the flow sheet starting from (IB), (which represents in the flow sheet the d+l-, d- or l-trimethylene-thiophanium d-camphorsulfonates) there is obtained d-biotin. When starting from the dextro-rotatory d-camphorsulfonate l-biotin is obtained.

The synthesis of nor-biotin is accomplished by an analogous series of reactions as illustrated by the following flow sheet.

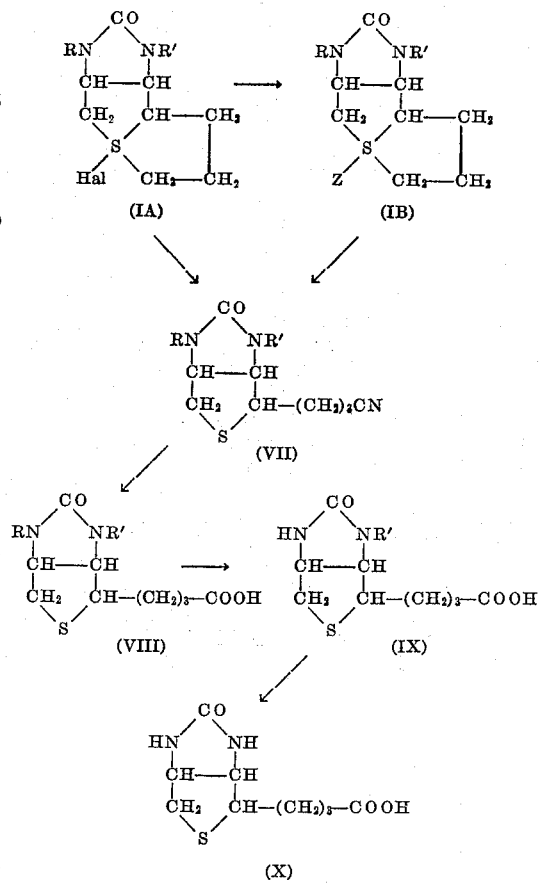

The thiophanium derivatives (IA or IB) are reacted with a metal cyanide, for instance, sodium or potassium cyanide. The nitrile (VII) thus obtained is saponified to form the corresponding acid (VIII), which upon replacement of R and R' by hydrogen, for example, by debenzylation if R and/or R' are benzyl radicals, yields d,l- or d- or l-nor-biotin (X), respectively. As in the case of biotin, the d,l-form is obtained from (IA) and the optically active forms from the dextro- and laevo-rotatory d-camphorsulfonates (IB).

To produce the thiophanium compound (I), we employ as a starting material a thiolactone of the following formula:

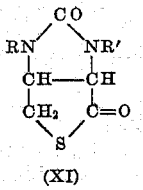

(XI)

in which R and R' have the same designation as in Formula I. A method for preparing this starting material is described in our application Serial No. 673,642, and other intermediates employed in the preparation of compound (XI) are also described in application Serial No. 744,152, filed April 26, 1947, and application, Serial No. 761,444, filed July 16, 1947, of which applications the instant application is a continuation-in-part.

The reactions involved in producing the thiophanium compounds (I) from the thiolactones (XI) can be illustrated by the following scheme. In this case, R and R' have the same significance as in Formula I, and Hal and Z as in Formulas IA and IB.

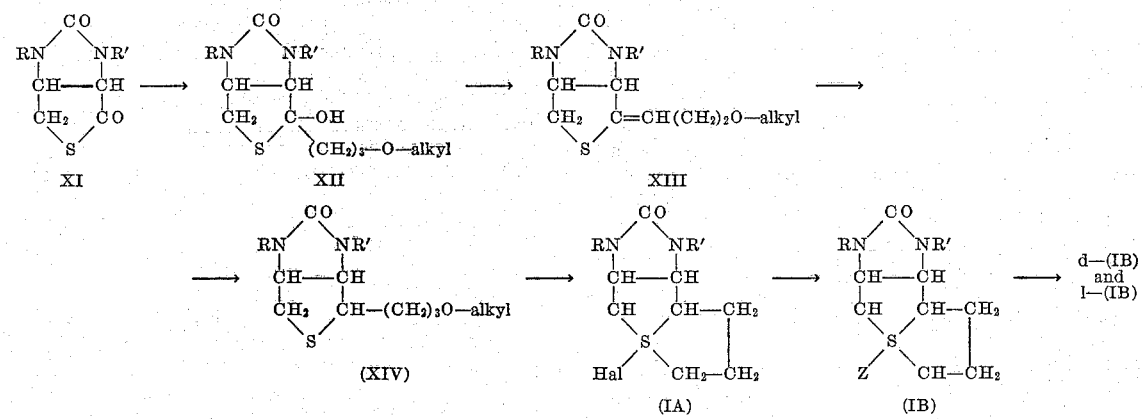

The thiolactone (XI) is reacted with a 1,3-alkoxy-propyl-magnesium halide to yield the 2-hydroxy-2-(ω-alkoxy-propyl)-thiophane (XII). The latter is dehydrated by treating with a dehydrating agent such as acetic acid, to produce the 2-(ω-alkoxy-propylidene)-thiophane (XIII), which is hydrogenated to form the 2-(ω-alkoxy-propyl)-thiophane (XIV). This, when halogenated, for example, with hydrogen bromide or hydrogen chloride, forms the thiophanium halide (IA), which can be converted to the mixture of thiophanium d-camphorsulfonates (IB), as described above. The latter is separated by fractional crystallization into its optical isomers d-(IB) and l-(IB).

In general, the preparation of the thiolactone (XI) is carried out in the following way:

A meso-diamino-succinic acid, for example, meso-bis-benzylamino-succinic acid, is reacted in alkaline solution with phosgene to form the corresponding imidazolidone-(2)-cis-4,5-dicarboxylic acid. This is treated with a dehydrating agent, such as acetic anhydride, to form the anhydride of the imidazolidone-(2)-cis-4,5-dicarboxylic acid. The latter is reduced with zinc, in the presence of an aliphatic acid and its anhydride, such as acetic acid and acetic anhydride, to yield the corresponding 3,4-(2'-keto-imidazolido)-2-keto-5-acyloxy-tetrahydrofuran. By reacting the latter with hydrogen sulfide in an acidified solution, for example, in an organic solvent acidified with hydrogen chloride, and then with a salt of hydrogen sulfide, such as potassium or sodium hydrosulfide, followed by reduction, as with zinc and acetic acid, the thiolactone (XI) is obtained. The procedure is described in more detail in the applications already referred to above.

The following examples will serve to illustrate our new processes for producing d,l-, d-, and l-, biotin, and the corresponding nor-biotins.

EXAMPLE 1

3,4-(1',3'-Dibenzyl-2'-keto-imidazolido)-2 - (ω,ω-dicarboxy-butyl)-thiophane or (d,l-delta-Carboxy-dibenzyl-biotin)

13.2 grams of dried 3,4-(1',3'-dibenzyl-2'-keto-imidazolido)-1,2-trimethylene-thiophanium bromide are added with stirring to a solution of 1.38 grams of sodium in 300 cc. freshly distilled diethyl malonate. The reaction mixture is stirred at 140–150° C. for two hours. It is then cooled, and ethyl acetate and water are added, whereupon the precipitated sodium bromide dissolves. The organic and aqueous layers are separated, and the latter is extracted twice more with ethyl acetate. After drying the combined organic extracts with sodium sulfate, the solvents are distilled off in vacuo, first using a steam bath and then an oil bath at about 100° C. The oily orange colored residue, containing the diethyl ester of d,l-delta-carboxy-dibenzyl-biotin, is refluxed for 8–10 hours with 250 cc. of methanol, 80 cc. of water and 120 cc. of 50 per cent potassium hydroxide. The reaction mixture is concentrated in vacuo to about one-eighth of its original volume, and then about 1500 cc. of water are added. A slight precipitate is formed, which is extracted with ethyl acetate. This is a neutral by-product. The aqueous solution is acidified with hydrochloric acid, whereupon an oil precipitates which is extracted with ethyl acetate. After drying over sodium sulfate and distilling the solvent off in vacuo, a solid residue is obtained. This is d,l-delta-carboxy-dibenzyl-biotin. It can be recrystallized from a mixture of acetone, ether and petrol-ether, and melts then at 133–135° C. with decomposition (evolution of carbon dioxide).

EXAMPLE 2

Decarboxylation of d,l - delta - carboxy-dibenzyl-biotin to d,l-dibenzyl-biotin 12 grams of d,l-delta-carboxy-dibenzyl-biotin are refluxed for 10 minutes in 100 cc. of o-dichlorobenzene. The solvent is steam distilled and the brown residue extracted with ethyl acetate. The ethyl acetate solution is dried and concentrated in vacuo. The oily residue, weighing about 11.8 grams is dissolved in boiling benzene, the solution is treated with charcoal, and filtered. Ether and petrol-ether are then added to the filtrate. After standing for at least 24 hours, d,l-dibenzyl-biotin crystallizes out. The product, which is somewhat colored, is filtered off and washed with ether on the suction funnel, until the filtrate is colorless. M. P. 109–112° C. After several crystallizations from a mixture of acetone, ether and petrol-ether, the melting point is constant at 122–124° C.

EXAMPLE 3

*Debenzylation of d,l-dibenzyl-biotin to d,l-monobenzyl-biotin*

A. 4.3 grams of crystalline d,l-dibenzyl-biotin are dissolved in 125 cc. of warm dry xylene, and placed in a 3-neck flask fitted with a mechanical stirrer and gas inlet and outlet tubes. An acetone-dry ice bath is provided. The solution is stirred and about 250 cc. of dry liquid ammonia are introduced. The actone bath is removed and 1.15 grams of sodium are added in small portions during the course of five minutes. The blue color of the solution remains even when it is stirred for another half hour. Ammonium chloride is added to destroy the excess of sodium. After distilling off the ammonia, and adding water and ether, the reaction mixture is acidified to pH 1 with hydrochloric acid and cooled to about 5° C. The crystalline precipitate is filtered off. Its melts at 165–172° C. Further purification is obtained by recrystallization from about 2 liters of boiling water. On standing, the product crystallizes out. It melts now at 175–176° C. and shows no melting point depression when mixed with a known sample of pure d,l-monobenzyl-biotin. The aqueous filtrate is extracted three times with chloroform, and the chloroform, after drying, is concentrated in vacuo. The residue consists likewise of d,l-monobenzyl-biotin.

For the preparation of d,l-monobenzyl-biotin, it is actually unnecessary to isolate the starting material, d,l-dibenzyl-biotin, in crystalline form, since the crude d,l-delta-carboxy-dibenzyl-biotin can also be decarboxylated by refluxing in xylene. This xylene solution of d,l-dibenzyl-biotin can be added directly to the solution of sodium in liquid ammonia employed for the debenzylation reaction.

B. 13.2 grams of 3,4-(1',3'-dibenzyl-2'-keto-imidazolido)-1,2-trimethylene-thiophanium bromide are condensed with sodium diethyl sodiomalonate as described in Example 1. After saponification, the acid fraction is refluxed in 200 cc. of dry xylene for 2½ hours, whereby the d,l-delta-carboxy-dibenzyl biotin is decarboxylated. The d,l-dibenzyl biotin thus formed dissolves in the xylene. The solution is then added dropwise in the space of half an hour to a stirred solution of 5.05 grams of sodium in 500 cc. of liquid ammonia. After stirring the reaction mixture for another hour, 1.3 grams of ammonium chloride are added, in order to destroy the excess of sodium. The reaction product is isolated as in (A) above, whereby crude d,l-monobenzyl-biotin melting at 167–171° C. is obtained. After recrystallization from boiling water, the melting point is 175–176° C.

EXAMPLE 4

*d,l-Biotin from d,l-monobenzyl-biotin*

A suspension of 10.8 grams of d,l-monobenzyl-biotin in 40 cc. of dry xylene is introduced into a 500 cc. three-neck flask containing 150 cc. of liquid ammonia. The mixture is stirred and cooled in a dry ice bath. After a white precipitate is formed, 1.5 grams of sodium are added. After the initial blue color has disappeared, sodium is added in small portions until a persistent blue color appears. 0.28–0.37 grams of sodium are usually needed. A slight excess of sodium (blue color) is destroyed with ammonium chloride, the ammonia is evaporated, and water and hydrochloric acid are added to the residue. The mixture is cooled to +5° C., the precipitate formed is filtered off, and washed with ether and distilled water. This precipitate, consisting of a mixture of d,l-biotin and unreacted d,l-monobenzyl-biotin, is extracted twice or three times with 800 cc. portions of boiling water. The aqueous solutions are cooled down to room temperature, filtered, thus separating the precipitated monobenzyl-biotin, and are then extracted with ethyl acetate, in order to remove small amounts of dissolved monobenzyl-biotin. The aqueous solutions are then concentrated in vacuo, yielding d,l-biotin. A further amount of d,l-biotin can be obtained by concentrating the original filtrate, containing also ammonium chloride, sodium chloride and hydrochloric acid. The ethyl acetate extracts are all combined and concentrated in vacuo, yielding unreacted monobenzyl-biotin. 30–50 per cent of unreacted d,l-monobenzyl-biotin are generally recovered. The reacted monobenzyl-biotin is converted into biotin with about 75 per cent yield. d,l-Biotin crystallizes from water in fine needles melting at 232–234° C.

If desired, the d,l-dibenzyl-biotin can be completely debenzylated in one step to d,l-biotin, without separation of unreacted monobenzyl-biotin. Dibenzyl-biotin is treated for this purpose with sodium in liquid ammonia in the ratio of about 1 mole of dibenzyl-biotin to about 3 gram atoms of sodium. The reaction mixture is then treated with an amount of ammonium chloride equivalent to the amount of sodium used. Another 3 gram atoms of sodium is employed, followed by the equivalent of ammonium chloride, and the treatment repeated a third time. The ammonia is then evaporated and the residue treated with water and hydrochloric acid. The precipitate formed is d,l-biotin.

EXAMPLE 5

*3,4-(N - monobenzyl - 2' - keto - imidazolido)-2-ω,ω-dicarboxy-butyl)-thiophane or (d,l-delta-carboxy-monobenzyl-biotin)*

4.27 grams of 3,4 - (N - monobenzyl - 2' - keto-imidazolido)-1,2-trimethylene-thiophanium bromide are added to 0.29 gram of sodium dissolved in 100 cc. of freshly distilled diethyl malonate. The reaction mixture is stirred for one hour at 120–130° C., whereupon it becomes neutral. Another 290 mg. of sodium are then added and the mixture is further heated for another hour at the same temperature. After cooling, water and ethyl acetate are added, the organic layer is separated and the aqueous solution extracted four times with ethyl acetate. The combined ethyl acetate extracts are dried over sodium sulfate and then concentrated in vacuo, first on the steam bath and then in an oil bath at 120–130° C. and 15 mm. The oily residue, containing the diethyl ester of d,l-delta-carboxy-monobenzyl-biotin (melting at 135–137° C. after recrystallization from acetone) is dissolved in a mixture of 150 cc. of methanol, 20 cc. of 50 per cent potassium hydroxide and 25 cc. of water. The solution is kept at room temperature for two days and is then subsequently refluxed for one hour. After concentrating the solution to one-eighth of its original volume, water is added. A slight precipitate is formed, which is extracted with ethyl acetate.

The aqueous solution is acidified with hydrochloric acid and extracted with ethyl acetate. The ethyl acetate solution is washed with water, dried and concentrated in vacuo. The solid residue can be crystallized from a mixture of acetone, ether and petrol-ether. d,l-Delta-carboxy-monobenzyl-biotin is thus obtained in fine needles which melt at 164–165° C. with evolution of carbon dioxide.

EXAMPLE 6

Decarboxylation of d,l - delta - carboxy - monobenzyl-biotin to d,l-monobenzyl-biotin d,l-Delta-carboxy-monobenzyl-biotin is converted into d,l-monobenzyl-biotin by refluxing in o-dichlorobenzene. After cooling the solution and adding ether, d,l-monobenzyl-biotin crystallizes out. M. P. 175–176° C. The d,l-monobenzyl-biotin can then be debenzylated as in Example 4 to obtain d,l-biotin.

EXAMPLE 7 l-3,4-(1',3' - dibenzyl-2'-keto - imidazolido)-1,2-trimethylene - thiophanium d - camphorsulfonate or (l-thiophanium d-camphorsulfonate)

36 grams of silver carbonate are treated with a solution of 58.1 grams of d-camphorsulfonic acid in 350 cc. distilled water. The solution of silver d-camphorsulfonate thus obtained is decanted from a small amount of undissolved silver carbonate, and is then added to a boiling solution of 111.4 grams of 3,4-(1',3'-dibenzyl-2'-keto-imidazolido) - 1,2 - trimethylene - thiophanium bromide in 3 liters of distilled water. The precipitated silver-bromide is filtered off, the solution is concentrated in vacuo to dryness, and the dry residue is dissolved in 2100 cc. of boiling isopropanol. After standing at room temperature for 24 hours, the crystalline voluminous precipitate formed is filtered off. The yield is 61.2 grams=82 per cent of a product having a specific optical rotation $[\alpha]_D^{25}$ of $-1.7\pm0.2°$. The material can be further purified by recrystallization from isopropanol. Needles melting at about 238–239° C. are obtained. The specific optical rotation of the pure material is $[\alpha]_D^{25}=-2.6°$. The dextro-rotatory antipode is contained in the mother liquids.

A mixture of absolute alcohol and ether can also be employed for the separation of the l- and d-isomers. Thus 9.3 grams of the crude mixture of the d-camphorsulfonates is dissolved in 50 cc. of absolute alcohol. 70 cc. of ether are added, and the precipitated crystals are filtered after one hour. The material thus obtained is, however, slightly less pure; $[\alpha]_D = -0.4°$

EXAMPLE 8 l-3,4-(1',3' - dibenzyl - 2' - keto - imidazolido)-2-(ω,ω-dicarboxy-butyl)-thiophane 43.5 grams of l - 3,4 - (1',3'-dibenzyl - 2' - keto-imidazolido) - 1,2 - trimethylene - thiophanium d-camphorsulfonate ($[\alpha]_D^{25}= -1.0°$ to $-2.6°$) and 60 cc. of toluene are added to a stirred warm (70° C.) solution of 5.05 grams of sodium in 80 grams of diethyl malonate. The mixture is refluxed for three hours, it is then cooled to room temperature, diluted with ether and washed with ice water to remove some dark impurities. The organic solution is concentrated in vacuo, and the oily residue is dissolved in 200 cc. of methanol. 300 cc. of a 50 per cent aqueous potassium hydroxide solution are added and the mixture is refluxed for five hours. The cooled solution is then diluted with water, acidified with concentrated hydrochloric acid and extracted with ethyl acetate. The ethyl acetate extract is concentrated in vacuo, and the crude oily reaction product is used for the next step. The product can be recrystallized from a mixture of acetone, ether and petrol-ether and forms prisms melting at 133–137° C. with decomposition. $[\alpha]_D^{25}=-4.4°$. (c=1.2 per cent in 0.1 N sodium hydroxide.)

EXAMPLE 9 l-3,4-(1',3'-dibenzyl-2'-keto-imidazolido) -2- (ω-carboxybutyl)-thiophane or l-dibenzyl-biotin 600 cc. of xylene are added to the crude oily 1-3,4-(1',3'-dibenzyl-2'-keto-imidazolido)-2-(ω,ω-dicarboxy-butyl)-thiophane (33–34 grams) obtained as described in the preceding example. The mixture is refluxed until the initially undissolved product is completely decarboxylated, and the dibenzyl-biotin formed is completely dissolved (10–20 minutes). The solution is then heated for another 20 minutes, during which time about 200 cc. of the solvent is distilled off. The rest of the solvent is removed by vacuum distillation. The oily residue, representing crude dibenzyl-biotin, is used for the next step without further purification. It is very difficult to crystallize. The crude material has a negative specific rotation.

EXAMPLE 10 d-Monobenzyl-biotin

About 5 grams of crude oily l-dibenzyl-biotin are dissolved in 30 cc. dry ethylene glycol diethyl ether (purified by fractionation, followed by refluxing over sodium for five hours and distilling onto fresh sodium). This solution is introduced rapidly with stirring into 100 cc. of liquid ammonia cooled in a dry ice bath. To the clear or slightly turbid solution are added in portions about 0.8 gram of sodium. The addition of sodium is stopped, even before the whole amount has been introduced, if a persistent blue color appears. This might be the case after the addition of as little as 0.62 gram. A slight excess of sodium (blue color), if present, is destroyed with some ammonium chloride. The ammonia is then evaporated, and water and hydrochloric acid are added to the residue. The mixture is cooled and the precipitated d-monobenzyl-biotin is filtered off. After recrystallization from dioxane, the compound forms prisms melting at 181–182° C., and showing a specific rotation $[\alpha]_D^{25}$ of $+108.1°\pm1°$. (1 per cent solution in 0.1 N sodium hydroxide.)

EXAMPLE 11 d-Biotin from d-monobenzyl-biotin

A suspension of 10.8 grams of d-monobenzyl-biotin in 40 cc. of dry xylene is introduced into a 500 cc. three-neck flask containing 150 cc. of liquid ammonia. The mixture is stirred and cooled in a dry ice bath. After a white precipitate is formed, 1.5 grams of sodium are added. After the initial blue color has disappeared, sodium is added in small portions until a persistent (15 minutes) blue color appears. 0.28–0.37 gram of sodium are usually needed. In this experiment only 0.28 gram was used up. A slight excess of sodium (blue color) is destroyed with ammonium chloride, the ammonia is evaporated, and water and hydrochloric acid are added to the residue. The mixture is cooled to +5° C., the precipitate formed is filtered off, and washed with ether and distilled water. This precipitate, consisting of a mixture of d-biotin and unreacted d-monobenzyl-biotin, is extracted twice or three times with 800 cc. portions of boiling water. The aqueous solutions are cooled down to room temperature, filtered, thus separating the precipitated monobenzyl-biotin, and are then extracted with ethyl acetate, in order to remove small amounts of dissolved monobenzyl-biotin. The aqueous solutions are then concentrated in vacuo, yielding d-biotin. A further amount of d-biotin can be obtained by concentrating the original filtrate, containing ammonium chloride, sodium chloride, and hydrochloric acid. The organic layers are all combined and concentrated in vacuo, yielding unreacted monobenzyl-biotin.

EXAMPLE 12 d-Biotin from l-dibenzyl-biotin

A solution of 11.5 grams of crude l-dibenzyl-biotin in 60 cc. of dry ethylene glycol diethyl ether (purified by fractionation, refluxing with sodium and distilling onto sodium) is introduced in a fine stream, into 200 cc. of liquid ammonia, cooled in a dry ice bath. Into the stirred solution 1.86 grams of sodium are introduced in small pieces. After 20 minutes 4.37 grams of ammonium chloride are added. The stirring is continued for 30 minutes, and to the almost clear solution another portion of 1.86 grams of sodium is added. After 20 minutes, 4.37 grams of ammonium chloride are added. The stirring is continued for 30 minutes more and then the addition of a third portion of sodium is started. The sodium is added in small portions until a blue color appears and persists for 20 minutes (about 1.3–1.8 grams sodium are needed). A slight excess of sodium is destroyed with some ammonium chloride, and the ammonia is evaporated. The residue is dissolved in water, and the reaction product is precipitated with concentrated hydrochloric acid. The mixture is cooled for 14 hours to +5° C. and filtered. The crude d-biotin thus obtained is recrystallized from boiling water, with the addition of some charcoal. Pure d-biotin crystallizes in fine needles melting at 232–234° C. and has a specific optical rotation of $[\alpha]_D^{25}$ +91.3±0.5° (c=1 per cent in 0.1 N sodium hydroxide solution).

EXAMPLE 13 d-3,4-(1',3'-dibenzyl-2'-keto-imidazolido) - 1,2 - trimethylene-thiophanium d-camphorsulfonate or (d-thiophanium d-camphorsulfonate)

The mother liquors obtained after separation of the l-thiophanium d-camphorsulfonate, described in Example 7, are concentrated in vacuo, and the residue is dissolved in the smallest possible amount of ethanol. Petrol-ether is added to this solution, causing the precipitation of the crystalline d-thiophanium d-camphorsulfonate.

This compound is purified by recrystallization from a mixture of ethanol and petrol-ether. Needles or prisms melting at 231–232° C. are obtained. The specific optical rotation $[\alpha]_D^{25}$ of this compound is +18.8°.

EXAMPLE 14 d-3,4-(1',3'-dibenzyl-2'-keto-imidazolido)-2-(ω,ω-dicarboxy-butyl)-thiophane 43.5 grams of d-3,4-(1',3'-dibenzyl-2'-keto-imidazolido) - 1,2 - trimethylenethiophanium d-camphorsulfonate ($[\alpha]_D^{25}$=+18.8°) and 60 cc. of toluene are added to a stirred warm (70° C.) solution of 5.05 grams of sodium in 80 grams of diethyl malonate. The mixture is refluxed for 3 hours, then cooled to room temperature, diluted with ether and the ether solution washed with ice water, thus removing some dark impurities. The organic solution is concentrated in vacuo, and the oily residue is dissolved in 200 cc. of methanol. 300 cc. of 50 per cent aqueous potassium hydroxide solution is added, and the mixture is refluxed for five hours. The cooled solution is then acidified with concentrated hydrochloric acid and extracted with ethyl acetate. The ethyl acetate extract is concentrated in vacuo, and the crude oily reaction product is used for the next step. The product can be recrystallized from a mixture of acetone, ether and petrol-ether, and forms prisms melting at 133–137° C. with decomposition. $[\alpha]_D^{25}$=+4.4°. (c=1.2 per cent in 0.1 N sodium hydroxide.)

EXAMPLE 15 d-Dibenzyl-biotin 600 cc. of xylene are added to the crude oily d-3,4-(1',3'-dibenzyl - 2' - keto - imidazolido) - 2- (ω,ω-dicarboxy-butyl)-thiophane (33–34 grams) obtained as described in the preceding example. The mixture is refluxed until the initially undissolved product is completely decarboxylated and the dibenzyl-biotin formed is completely dissolved (10–20 minutes). The solution is then heated for another 20 minutes, during which time about 200 cc. of the solvent is distilled off. The rest of the solvent is removed by vacuum distillation. The oily residue consists of crude d-dibenzyl-biotin and is used for the next step without further purification. The product is very difficult to crystallize. The crude material shows a positive specific rotation.

EXAMPLE 16 l-Monobenzyl-biotin

About 5 grams of crude oily d-dibenzyl-biotin are dissolved in 30 cc. dry ethylene glycol diethyl ether (purified by fractionation, followed by refluxing over sodium for five hours and distilling onto fresh sodium). This solution is introduced rapidly with stirring into 100 cc. of liquid ammonia cooled in a dry ice bath. To the clear or slightly turbid solution are added in portions, 0.8 gram of sodium. The addition of the sodium is stopped, even before the whole amount has been introduced, if a persistent blue color appears. A slight excess of sodium (blue color), if present, is destroyed with some ammonium chloride, and the ammonia is evaporated. Water and hydrochloric acid are added to the remaining mixture. The mixture is cooled and the precipitated l-monobenzyl-biotin is filtered off.

After recrystallization from dioxane, the compound forms prisms melting at 181–182° C. and showing a specific rotation $[\alpha]_D^{25}$ of —108.1° ±1°. (1 per cent solution of 0.1 N sodium hydroxide.)

EXAMPLE 17 l-Biotin from l-monobenzyl-biotin

A suspension of 10.8 grams of l-monobenxylbiotin in 40 cc. of dry xylene is introduced into a 500 cc. three-neck flash containing 150 cc. liquid ammonia. The mixture is stirred and cooled in a dry ice bath. After a white precipitate is formed, 1.5 grams of sodium are added. After the initial blue color has disappeared, sodium is added in small portions until a persistent (15 minutes) blue color appears. 0.28-0.37 gram of sodium are usually needed. A slight excess of sodium (blue color) is destroyed with ammonium chloride, the ammonia is evaporated, and water and hydrochloric acid are added to the residue. The mixture is cooled to +5° C., the precipitate formed is filtered off and washed with ether and distilled water. This precipitate, consisting of a mixture of l-biotin and unreacted l-monobenzyl-biotin, is extracted twice or three times with 800 cc. portions of boiling water. The aqueous solutions are cooled down to room temperature, filtered, thus separating the precipitated l-monobenzyl-biotin, and are then extracted with ethyl acetate, in order to remove small amounts of dissolved l-monobenzyl-biotin. The aqueous solutions are then concentrated in vacuo, yielding l-biotin. A further amount of l-biotin can be obtained by concentrating the original filtrate, containing also ammonium chloride, sodium chloride and hydrochloric acid. The organic layers are all combined and concentrated in vacuo, yielding unreacted l-monobenzyl-biotin. 30-50 per cent l-monobenzyl-biotin are recovered, the rest is converted into l-biotin with 75 per cent yield. l-biotin crystallizes from water in fine needles melting at 232–234° C. It has a specific optical rotation $[\alpha]_D^{25}$ of −91.3° ±0.5°. (c=1 per cent in 0.1 N sodium hydroxide solution.)

EXAMPLE 18

*l-Biotin from d-dibenzyl-biotin*

A solution of 11.5 grams of crude d-dibenzyl-biotin in 60 cc. of dry ethylene glycol diethyl ether (purified by fractionation, refluxing with sodium and distilling over sodium) is introduced in a fine stream into 200 cc. liquid ammonia, cooled in a dry ice bath. Into the stirred solution are introduced 1.86 grams of sodium in small pieces. After 20 minutes, 4.37 grams of ammonium chloride are added. The stirring is continued for 30 minutes; and to the almost clear solution is then added another portion of 1.86 grams of sodium. After 20 minutes, 4.37 grams of ammonium chloride are added. The stirring is continued for another 30 minutes and then the addition of a third portion of sodium is started. The sodium is added in small portions until a blue color appears and persists for 20 minutes (about 1.3-1.8 grams of sodium are needed). A slight excess of sodium is destroyed with some ammonium chloride, and the ammonia is then evaporated. The residue is dissolved in water, and the reaction product is precipitated with concentrated hydrochloric acid. The mixture is cooled for 14 hours to +5° C. and filtered. The crude l-biotin is recrystallized from boiling water, with the addition of some charcoal. The pure product is obtained in form of fine needles melting at 232–234° C. and having a specific optical rotation of $[\alpha]_D^{25}=-91.3\pm0.5°$ (c=1 per cent in 0.1 N sodium hydroxide solution).

The production of thiophanium halides of Formula I is illustrated by the following examples.

EXAMPLE 19

*3,4-(1',3'-dibenzyl-2'-keto-imidazolido)-2-hydroxy-2-(ω-ethoxypropyl)-thiophane*

A Grignard solution, prepared from 13.6 cc. of 3-ethoxypropyl-bromide and an excess of magnesium (4.8 grams) in 30 cc. of ether and 10 cc. of benzene, is diluted with benzene, decanted from the unreacted magnesium and added dropwise (in about 30 minutes) to a boiling, stirred solution of 27 grams of 3,4-(1',3'-dibenzyl-2'-keto-imidazolido)-2-keto-thiophane (thiolactone) in 350 cc. of benzene. The solution is refluxed for another 3½ hours. The mixture is then decomposed with ice and dilute sulfuric acid, the organic layer is separated and concentrated in vacuo. The residue is dissolved in methanol and heated to 50° C. with an excess of aqueous sodium hydroxide solution. Ether and water are added, and the two layers are separated. The alkaline aqueous solution contains the unreacted thiolactone, which is extracted and recovered after acidification. The ether layer, containing the reaction product, is dried and concentrated in vacuo. The residue is crystallized from ether, petrol-ether.

The product is soluble in strong alkali and gives a positive mercaptan test with sodium nitroprusside. It can be recrystallized from a mixture of acetone, ether and petrol-ether. Prisms melting at 114.5–115.5° C. are obtained.

EXAMPLE 20

*3,4-(1',3'-dibenzyl-2'-keto-imidazolido)-2-(ω-ethoxy-propylidene)-thiophane*

A solution of 20.0 grams of 3,4-(1',3'-dibenzyl-2'-keto-imidazolido)-2-hydroxy-2-(ω-ethoxypropyl)-thiophane in 100 cc. acetic acid is refluxed for 1½ hours. The solution is concentrated in vacuo, the residue is dissolved in ether and the solution is washed with dilute sodium carbonate solution. The ether solution is dried and concentrated in vacuo. The oily residue solidifies after a few hours. It can be recrystallized from petrolether and forms fine needles melting at 62.5–63.5° C.

EXAMPLE 21

*3,4-(1',3'-dibenzyl-2'-keto-imidazolido)-2-(ω-ethoxypropyl)-thiophane*

The crude 3,4-(1',3'-dibenzyl-2'-keto-imidazolido)-2-(ω-ethoxy-propylidene)-thiophane (19 grams), obtained in the preceding example, is dissolved in 150 cc. of methanol and hydrogenated in the presence of 4 grams of prehydrogenated palladium oxide at room temperature and atmospheric pressure. The calculated amount of hydrogen is taken up in about 30 hours. The catalyst is then filtered off, and the solution is concentrated in vacuo. The product solidifies after some time and is used in the crude form for the next step.

Other palladium catalysts, for example, Pd on charcoal or on barium sulfate, and also Raney nickel can be used instead of palladium oxide.

EXAMPLE 22

*3,4-(1',3'-dibenzyl-2'-keto-imidazolido)-1,2-trimethylene-thiophanium bromide*

A solution of 5 grams of 3,4-(1',3'-dibenzyl-2'-keto-imidazolido)-2-(ω-ethoxypropyl)-thiophane in 50 cc. of an 18 per cent solution of hydrogen bromide in acetic acid is heated for three hours to 60° C. The solution is concentrated in vacuo, and treated with water and benzene. The mixture is cooled to +5° C. and the precipitated crystalline reaction product is filtered off and washed with benzene and cold water. A further amount of the product can be obtained by concentrating the aqueous part of the mother liquors (the benzene layer contains only impurities). The product can be recrystallized from water. Thick plates melting at 220–222° C. are obtained.

EXAMPLE 23

*3,4-(1',3'-dibenzyl-2'-keto-imidazolido)-1,2-trimethylene-thiophanium chloride*

4.2 grams of crude 3,4-(1',3'-dibenzyl-2'-keto-imidazolido)-2-(ω-ethoxypropyl)-thiophane are dissolved in 50 cc. of 99 per cent formic acid saturated with hydrogen chloride (about 5 per cent). The solution is heated for two hours to 50–60° C., and is then concentrated in vacuo. The residue is dissolved in water and extracted with ether to remove impurities. The aqueous solution is concentrated to dryness, and the residue is recrystallized from aqueous acetone. Prisms melting at 158–159° C. are obtained. The product is very soluble in water.

EXAMPLE 24

*3,4-(N-monobenzyl-2'-keto-imidazolido)-2-(ω-ethoxy-propyl)-thiophane*

To a stirred mixture of liquid ammonia (about 20 cc.), and a solution containing 1.4 grams of crude 3,4-1',3'-dibenzyl-2'-keto-imidazolido)-2-(ω-ethoxy-propyl)-thiophane in 10–20 cc. xylene, sodium is added in small portions until the blue color persists (about 0.166 gram sodium is used). The last excess of sodium is destroyed with ammonium chloride, the ammonia is evaporated, and dilute sulfuric acid and ether are added. This mixture is stirred for a while and then filtered. The bulk of the reaction product remains on the funnel; a smaller part is dissolved in the ether layer of the filtrate. The ether solution is separated (if some product precipitates, ethyl acetate is added), dried and concentrated in vacuo. The residue is recrystallized from acetone ether, together with the product obtained by filtration. Needles melting at 136–137° C. are obtained.

The acetyl derivative of this product can be prepared in the following way: 1 gram of the monobenzyl-compound and 4 grams of barium carbonate are stirred and refluxed for 1½ hours with 20 cc. acetic anhydride and 20 cc. acetyl chloride. The mixture is cooled, filtered, concentrated, and the residue is recrystallized from a mixture of benzene and petrol-ether. Needles melting at 85–85.5° C. are obtained.

EXAMPLE 25

*3,4-(monobenzyl-2'-keto-imidazolido)-1,2-trimethylene-thiophanium bromide*

A solution of 5 grams of 3,4-(monobenzyl-2'-keto-imidazolido)-2-(ω-ethoxypropyl)-thiophane in 50 cc. of an 18 per cent solution of hydrogen bromide in acetic acid is heated for three hours at 60° C. The solution is concentrated in vacuo and treated with benzene and water. The aqueous layer is separated and concentrated in vacuo. The residue is recrystallized from alcohol, or a mixture of alcohol and dioxane. Prisms melting at 167–167.5° C. are obtained.

EXAMPLE 26

*3,4-(monobenzyl-2'keto-imidazolido)-1,2-trimethylene-thiophanium chloride*

A solution of 4.0 grams of 3,4-(monobenzyl-2'-keto-imidazolido)-2-(ω-ethoxypropyl)-thiophane in 100 cc. 99 per cent formic acid saturated with hydrogen chloride is kept at room temperature for 48 hours and is then heated for 2 hours at 50° C. The solution is then concentrated in vacuo, and the residue is treated with water. The aqueous solution is filtered, extracted with ethyl acetate, in order to remove all unreacted starting material, and is then concentrated in vacuo. The crystalline residue is recrystallized from a mixture of water, ethanol and ether. Prisms melting at 158–160° C. are obtained. The product softens around 130° C. and resolidifies again.

EXAMPLE 27

*Mixture of d- and l-3,4-(monobenzyl-2'-keto-imidazolido)1,2-trimethylene-thiophanium d-camphorsulfonates*

A solution of 0.35 gram (1 m. mole) of 3,4-(monobenzyl-2'-keto-imidazolido)-1,2-trimethylene-thiophanium bromide in 10 cc. water is treated with 5 cc. of an aqueous solution containing 1 m. mole of silver d-camphorsulfonate. The precipitated silver bromide is filtered off and the aqueous solution is concentrated in vacuo. The residue is recrystallized from a mixture of ethanol and acetone. The mixture crystallizes in large prisms melting at 205–206.5° C. Its specific optical rotation is +10.5° (c=2 per cent in water), which corresponds to the rotation contributed by the d-camphorsulfonate ion. It yields optically inactive monobenzyl-biotin if reacted with diethyl-sodiomalonate, followed by saponification and decarboxylation in the same manner as described for d- and l-3,4-(1',3'-dibenzyl-2'-keto-imidazolido)-1,2-trimethylene-thiophanium d-camphorsulfonates.

EXAMPLE 28

*3,4-(1',3'-dibenzyl-2'-keto-imidazolido)-2-(ω-cyanopropyl)-thiophane*

4.45 grams of 3,4-(1',3'-dibenzyl-2'-keto-imidazolido)-1,2-trimethylenethiophanium bromide, 3.2 grams of potassium cyanide, 250 cc. of alcohol and 30 cc. of water are refluxed for eight hours. The clear solution is concentrated on the steam bath to a volume of about 70 cc., concentrated hydrochloric acid being added at the same time in order to destroy the excess potassium cyanide. About 800 cc. of water are added, and the precipitated oil is extracted several times with chloroform and ethyl acetate. After drying and concentrating the organic extract in vacuo, an oily residue weighing about 4 grams is obtained. This material is used without further purification for the next step of the synthesis.

EXAMPLE 29

*d,l-Dibenzyl-nor-biotin*

About 4 grams of impure 3,4-(1',3'-dibenzyl-2'-keto-imidazolido)-2-(ω-cyanopropyl)-thiophane, 11 grams of potassium hydroxide, 80 cc. of methanol and 50 cc. of water are refluxed for 17 hours. The clear solution is concentrated on the steam-bath to a volume of about 25 cc. Water is then added and the neutral by-products extracted with ethyl acetate and chloroform. The aqueous solution is then acidified with concentrated hydrochloric acid and extracted with ethyl acetate and chloroform. The combined extracts are concentrated in vacuo, leaving an oily residue of 3.2 grams. This oil crystallizes from a mixture of acetone, ether and petrol-ether. After several such recrystallizations, the product melts at 118–120° C. Large flat plates are obtained.

EXAMPLE 30 d,l-Nor-biotin 3.2 grams of crude d,l-dibenzyl-nor-biotin, dissolved in 30 cc. of warm purified ethylene glycol diethyl ether are added dropwise with stirring into 200 cc. of liquid ammonia. A very fine suspension of the ammonium salt of d,l-dibenzyl-biotin is formed. The reaction mixture is stirred and 500 mg. sodium are added rapidly in small pieces. After stirring for 10 minutes, the blue color disappears. The solution is stirred for 20 minutes, then 1.2 grams ammonium chloride are added, and the mixture stirred again for 30 minutes. This process is repeated three times in all. After distilling off the ammonia, water is added, and sufficient concentrated hydrochloric acid to bring the solution to pH 1. The product is filtered off and washed with chloroform and ethyl acetate. The aqueous filtrate is extracted with chloroform and concentrated in vacuo until crystals appear. Both precipitates are dissolved with stirring in about 300 cc. boiling water. The hot solution is filtered from insoluble material, and then stirred with chloroform. The chloroform is separated, the aqueous layer filtered and concentrated in vacuo, until crystallization begins. After standing at 4° C. for 24 hours, the product is filtered off, washed with water and then with ether on the suction funnel. M. P. 230–233° C.

On concentrating the aqueous filtrate and cooling, 50 mg. of less pure d,l-nor-biotin are obtained, melting at 227° C. d,l-Nor-biotin gives a melting point depression of about 20° C. with d,l-biotin.

The combined organic extracts, after drying and concentrating in vacuo, yield a solid residue. After taking up the residue in ether and filtering, it melts at 195–198° C. This product is impure d,l-monobenzyl-nor-biotin.

EXAMPLE 31

3,4-(M-monobenzyl-2'-keto-imidazolido)-2-(ω-cyanopropyl)-thiophane 1.75 grams of 3,4-(N-monobenzyl-2'-keto-imidazolido)-1,2-trimethylene thiophanium bromide, 1.6 grams of potassium cyanide and 100 cc. methanol are refluxed for 23 hours. The brown solution is concentrated on the steam bath, concentrated hydrochloric acid being added to destroy the excess of potassium cyanide, and after diluting with water, an oil is extracted with chloroform and ethyl acetate. The combined extracts are dried, concentrated in vacuo, and the solid residue, weighing 1.28 grams and containing traces of oil, is taken up in ether and filtered. The crude product melts at 145–147° C. After two recrystallizations from a mixture of methanol, ether and petrol-ether, it is pure and melts at 163–164° C.

The same product is obtained starting with a mixture of the d and l-3,4-(N-monobenzyl-2'-keto-imidazolido)-1,2-trimethylene-thiophanium d-camphorsulfonates, instead of the thiophanium bromide derivative.

EXAMPLE 32 d,l-Monobenzyl-nor-biotin 1.5 grams of d,l-3,4-(N-monobenzyl-2'-keto-imidazolido)-2-(ω-cyanopropyl)-thiophane are refluxed for 14 hours in a solution of 6 grams of potassium hydroxide in 25 cc. of water and 40 cc. of methanol. The brown solution is then concentrated in the steam bath. Water is added, and the cloudy solution is extracted with chloroform. The aqueous layer is acidified with concentrated hydrochloric acid, and the precipitated crystals are filtered off. They are recrystallized from methanol. Fine needles, melting at 207–208° C. are obtained.

We claim:

1. A method of producing a thiophanium salt of the following formula:

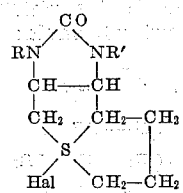

which comprises reacting a thiolactone of the following formula:

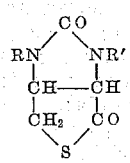

with a 1,3-alkoxy-propyl-magnesium halide to yield a 3,4-(2'-keto-imidazolido)-2-hydroxy-2-(ω-alkoxy-propyl)-thiophane, dehydrating the latter to produce a 3,4-(2'-keto-imidazolido)-2-(ω-alkoxy-propylidene)-thiophane, hydrogenating the last mentioned compound to form a 3,4-(2'-keto-imidazolido)-2-(ω-alkoxy-propyl)-thiophane, replacing in the latter the alkoxy group by halogen to form the thiophanium compound of the above formula, R and R' in the above formulae standing for hydrogen and a radical replaceable by hydrogen selected from the group consisting of aralkyl and lower acyl radicals, at least one of R and R' being such a radical.

2. A process as in claim 1 wherein R and R' in the formulae represent benzyl radicals.

3. A process as in claim 1 wherein the 1,3-alkoxy-magnesium halide is 1,3-alkoxy-propyl-magnesium bromide.

4. The process of claim 1 wherein the thiophanium halide is reacted with a salt of d-camphorsulfonic acid and the resulting mixture of the diastereomeric d-camphorsulfonates fractionally crystallized to obtain the d- and l-3,4-(2'-keto-imidazolido)-1,2-trimethylene-thiophanium d-camphorsulfonates.

5. A process in claim 1 in which the thiophanium compound formed is converted into the corresponding 3,4-(2'-keto-imidazolido)-2-(ω-carboxy-alkyl)-thiophane, and replacing with hydrogen any hydrogen-replaceable radicals in the 1' and 3'-positions of the last mentioned compound.

6. A process as in claim 8 in which R and R' represent benzyl groups, and the 1-3,4-(1',3'-dibenzyl-2'-keto-imidazolido)-1,2-trimethylene-thiophanium d-camphorsulfonate obtained is reacted wiht a dialkyl metallo-malonate to form 1-3,4-(1',3'-dibenzyl-2'-keto-imidazolido)-2-(ω,ω-dicarbalkoxy-butyl)-thiophane, the latter compound saponified to form 1-3,4-(1',3'-dibenzyl-2'-keto-imidazolido)-2-(ω,ω-dicarboxybutyl)-thiophane, which is decarboxylated to form 1-3,4-(1',3'-dibenzyl-2'-keto-imidazolido)-2-(ω-carboxybutyl)-thiophane, and the latter compound debenzylated to form d-biotin.

7. A process which comprises halogenating a 3,4-(2'-keto-imidazolido)- 2 -(ω-alkoxy-propyl)-thiophane which can be represented by the following formula:

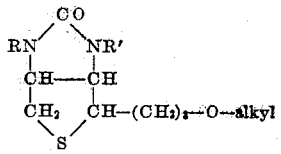

to form a 3,4-(2'-keto-imidazolido)1,2-trimethylene-thiophanium halide which can be represented by the following formula:

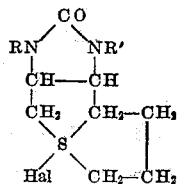

wherein R and R' stand for hydrogen and a radical replaceable by hydrogen of the group consisting of aralkyl and lower acyl radicals.

8. A process of reacting a thiophanium halide of the following formula:

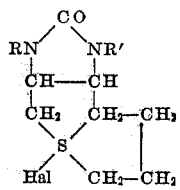

with a salt of d-camphorsulfonic acid, and fractionally crystallizing the resulting mixture of the diastereomeric d-camphorsulfonates to obtain the d- and l-3,4-(2'-keto-imidazolido)-1,2-trimethylene-thiophanium d-camphorsulfonates, R and R' representing hydrogen and a radical replaceable by hydrogen selected from the group consisting of aralkyl and lower acyl radicals at least one of R and R' being such a radical.

9. A process which comprises reacting 3,4-(1',3'-dibenzyl-2' - keto - imidazolido)-2-(ω-ethoxypropyl)-thiophane with hydrogen bromide so as to form 3,4-(1',3'-dibenzyl-2'-keto-imidazolido)-1,2-trimethylene-thiophanium bromide.

10. A thiophanium compound of the following formula:

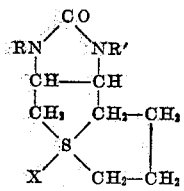

wherein R and R' stand for hydrogen and a radical replaceable by hydrogen selected from the group consisting of aralkyl and lower acyl radicals, at least one of R and R' being such a radical, and X stands for an anion.

11. 3,4-(1',3'-dibenzyl - 2' - keto-imidazolido)-1,2-trimethylene-thiophanium halogenide.

12. 3,4-(1',3'-dibenzyl - 2' - keto-imidazolido)-1,2-trimethylene-thiophanium bromide.

13. 1-3,4-(1',3' - dibenzyl - 2' - keto - imidazolido)-1,2-trimethylene-thiophanium d-camphorsulfonate.

14. d-3,4-(1',3' - dibenzyl - 2' - keto - imidazolido)-1,2-trimethylene-thiophanium d-camphorsulfonate.

MOSES WOLF GOLDBERG.
LEO H. STERNBACH.

No references cited.